United States Patent
Matsuoka (10) Patent No.: US 11,354,789 B2
(45) Date of Patent: Jun. 7, 2022

(54) IMAGE PROCESSING APPARATUS AND CONTROL METHOD THEREOF

(71) Applicant: CANON KABUSHIKI KAISHA, Tokyo (JP)

(72) Inventor: Narumi Matsuoka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 275 days.

(21) Appl. No.: 16/554,968

(22) Filed: Aug. 29, 2019

(65) Prior Publication Data
US 2020/0074602 A1 Mar. 5, 2020

(30) Foreign Application Priority Data

Sep. 3, 2018 (JP) .............................. JP2018-164801
Jul. 31, 2019 (JP) .............................. JP2019-141685

(51) Int. Cl.
*G06T 7/90* (2017.01)
*G06T 5/00* (2006.01)

(52) U.S. Cl.
CPC ................ *G06T 5/009* (2013.01); *G06T 7/90* (2017.01); *G06T 2207/20208* (2013.01)

(58) Field of Classification Search
CPC ............. G06T 7/90; H04N 7/015; H04N 5/76
See application file for complete search history.

(56) References Cited

U.S. PATENT DOCUMENTS

| | | | | |
|---|---|---|---|---|
| 2009/0086074 A1* | 4/2009 | Li | .................. | H04N 5/2353 348/308 |
| 2012/0127371 A1* | 5/2012 | Watanabe | ......... | H04N 21/4318 348/687 |
| 2015/0208102 A1* | 7/2015 | Takahashi | .............. | H04N 5/76 348/441 |
| 2016/0150180 A1* | 5/2016 | Kozu | ................. | H04N 9/8042 386/254 |
| 2017/0237959 A1* | 8/2017 | Toma | .................... | H04N 7/015 348/453 |
| 2018/0146225 A1* | 5/2018 | Hannuksela | ........ | H04N 21/8146 |
| 2018/0213265 A1* | 7/2018 | Toma | .................... | H04N 19/89 |

FOREIGN PATENT DOCUMENTS

| | | |
|---|---|---|
| JP | 2017-184220 A | 10/2017 |
| JP | 2018-093530 A | 6/2018 |

* cited by examiner

*Primary Examiner* — Myron Wyche
(74) *Attorney, Agent, or Firm* — Cowan, Liebowitz & Latman, P.C.

(57) ABSTRACT

An image processing apparatus that records a high dynamic range (HDR) signal as a file. The apparatus acquires information indicating peak luminance corresponding to one output dynamic range, of a plurality of different output dynamic ranges, in accordance with shooting settings of the HDR signal. The apparatus then records a first value based on the acquired information to the file along with the HDR signal.

18 Claims, 11 Drawing Sheets

IMAGE PROCESSING APPARATUS AND CONTROL METHOD THEREOF

BACKGROUND OF THE INVENTION

Field of the Invention

The present invention relates to an image processing apparatus and a control method thereof, and specifically relates to technology for handling a high dynamic range (HDR) signal.

Description of the Related Art

Display apparatuses having a wider dynamic range of display luminance compared with known apparatuses have been realized due to improved performance of light emitting elements (LEDs, for example) or the like. In such display apparatuses, an image (HDR image) having colors and details in a high luminance range that cannot be expressed in known display apparatuses can be faithfully displayed.

Signal characteristics illustrating the relationship between a video signal level and display luminance in an HDR image are defined in EOTF (Electro-Optical Transfer Function). Also, there are two EOTFs, namely PQ (Perceptual Quantization) standardized in SMPTE ST 2084 and HLG (Hybrid Log Gamma) standardized in ARM STD-B67. A major difference between HLG and PQ is that the display luminance is handled as a relative value in HLG, but the display luminance is handled as an absolute value whose maximum is 10000 nits (or $cd/m^2$) in PQ. Therefore, when shooting is performed in a shooting mode in which the output dynamic range changes, there may be a case where the display peak luminance changes in PQ.

Figure 1:
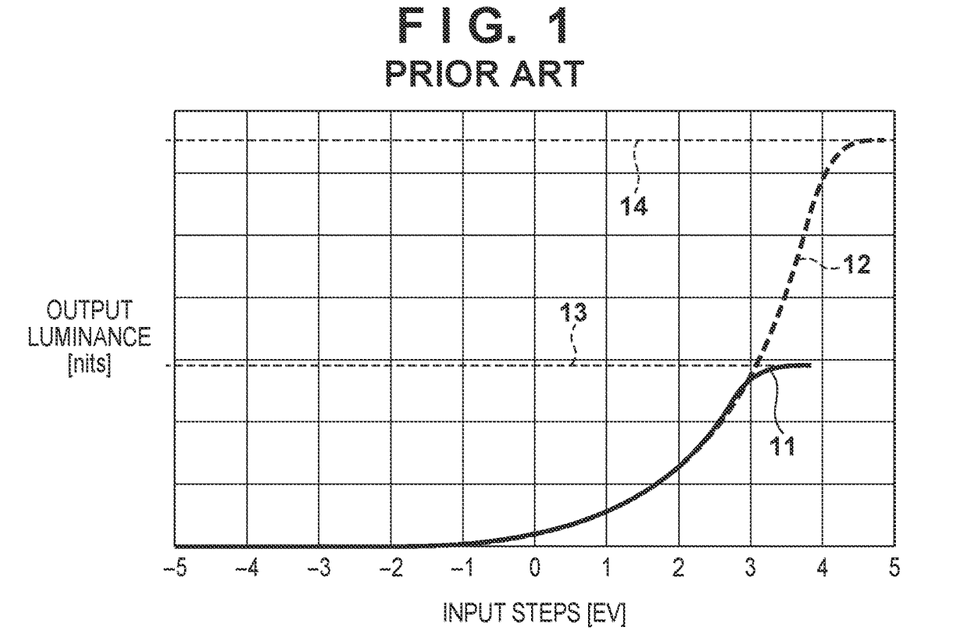
FIG. 1 is a diagram illustrating gamma curves in shooting modes in which the peak luminance is different.

FIG. 1 shows an example of the input-output characteristics when the output dynamic range changes between two shooting modes denoted by 11 and 12, and the horizontal axis shows input steps [EV] and the vertical axis shows output luminance. When the gamma curves of the two shooting modes are compared, it is apparent that the input-output characteristics are the same other than the high luminance range, and the peak luminance differs as denoted by 13 and 14. Note that, hereinafter, the signal characteristics of an HDR image are assumed to be conformable to PQ, unless otherwise specifically noted.

Incidentally, an image signal (SDR signal) having a known display luminance dynamic range (Standard Dynamic Range: SDR) is premised on a viewing environment with EOTF of $\gamma=2.2$ or the like, but an HDR image signal (HDR signal) is premised on a viewing environment with EOTF of PQ or the like. Therefore, when an image is reproduced from an HDR signal in a viewing environment in which an SDR signal is envisioned, a video that is different from the video intended by a producer is displayed. In order to avoid such a problem, for example, a tone mapping is conceivable in which the tone values of the HDR signal are converted (compressed) to tone values of the SDR signal for viewing in the SDR environment, although the effect of HDR is lost. Note that static metadata called maxCLL (maximum Content Light Level) indicating the maximum luminance of the contents can be added to the HDR signal. As a result of referring to maxCLL, a reproduction device can specify the maximum luminance of the received HDR contents.

Japanese Patent Laid-Open No. 2017-184220 (Document 1) and Japanese Patent Laid-Open No. 2018-093530 (Document 2) disclose tone mappings for converting an HDR signal to an SDR signal. Document 1 discloses designing a tone mapping characteristic using a maximum luminance level estimated using the shape of histogram of luminance values and maxCLL of the HDR signal. Also, Document 2 discloses designing a tone mapping characteristic in accordance with a geometric-formed region in an image in order to suppress tone jump in a low frequency subject such as the sky.

In the method in Document 1, the mapping that maps the maximum luminance level of the HDR signal to the maximum value of the EOTF domain of SDR is performed, for example, even in a case where the HDR signal was obtained by shooting in an underexposure condition. Therefore, the mapped SDR signal viewed in the SDR environment may look brighter than the original HDR signal viewed in the HDR environment.

Also, in the method in Document 2, the tone mapping does not consider the dynamic range of the HDR image and thus the output SDR signal sometimes may not represent the brightness intended by a producer.

SUMMARY OF THE INVENTION

The present invention has been made in view of the foregoing problem in the known technologies. The present invention provides an image processing apparatus and a control method thereof for converting an HDR signal to a SDR signal such that the change in brightness can be suppressed between a case of viewing in an HDR environment and a case of viewing in an SDR environment.

According to an aspect of the present invention, there is provided an image processing apparatus that records a high dynamic range (HDR) signal as a file, comprising: one or more processors that execute instructions stored in a memory to function as: an acquisition unit configured to acquire information indicating peak luminance corresponding to one output dynamic range, of a plurality of different output dynamic ranges, in accordance with shooting settings of the HDR signal; and a recording unit configured to record a first value based on the information acquired by the acquisition unit to the file along with the HDR signal.

According to another aspect of the present invention, there is provided an image processing apparatus that processes a high dynamic range (HDR) signal, comprising: one or more processors that execute instructions stored in a memory to function as: an acquisition unit configured to acquire a first value indicating peak luminance in an output dynamic range in accordance with shooting settings of the HDR signal, the first value being recorded in association with the HDR signal, and a conversion unit configured to convert the HDR signal to a signal in a predetermined format by performing a tone-mapping that maps tone values of the HDR signal to tone values in the predetermined format having a different dynamic range, based on the first value.

According to a further aspect of the present invention, there is provided a control method of an image processing apparatus that records a high dynamic range (HDR) signal as a file, the control method comprising: acquiring information indicating peak luminance corresponding to one output dynamic range, of a plurality of different output dynamic ranges, in accordance with shooting settings of the HDR signal; and recording a first value based on the information acquired by the acquiring to the file along with the HDR signal.

According to another aspect of the present invention, there is provided a control method of an image processing apparatus that processes a high dynamic range (HDR)

signal, the control method comprising: acquiring a first value indicating peak luminance in an output dynamic range in accordance with shooting settings of the HDR signal, the first value being recorded in association with the HDR signal, and converting the HDR signal to a signal in a predetermined format by performing a tone-mapping that maps tone values of the HDR signal to tone values in the predetermined format having a different dynamic range, based on the first value.

According to a further aspect of the present invention, there is provided a non-transitory computer-readable medium that stores instructions executable by a computer, wherein the instructions, when executed by the computer, causes the computer to operate as an image processing apparatus that records a high dynamic range (HDR) signal as a file, comprising: an acquisition unit configured to acquire information indicating peak luminance corresponding to one output dynamic range, of a plurality of different output dynamic ranges, in accordance with shooting settings of the HDR signal; and a recording unit configured to record a first value based on the information acquired by the acquisition unit to the file along with the HDR signal.

According to another aspect of the present invention, there is provided a non-transitory computer-readable medium that stores instructions executable by a computer, wherein the instructions, when executed by the computer, causes the computer to operate as an image processing apparatus that processes a high dynamic range (HDR) signal, comprising: an acquisition unit configured to acquire a first value indicating peak luminance in an output dynamic range in accordance with shooting settings of the HDR signal, the first value being recorded in association with the HDR signal, and a conversion unit configured to convert the HDR signal to a signal in a predetermined format by performing a tone-mapping that maps tone values of the HDR signal to tone values in the predetermined format having a different dynamic range, based on the first value.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings. Note that the embodiments to be described are merely illustrative, and do not limit the scope of the present invention. For example, the following describes embodiments in which the present invention is applied to a digital camera. However, the digital camera is merely an example of an image processing apparatus to which the present invention can be applied. The present invention can be implemented in any electronic device. Such an electronic device includes an image capture apparatus, of course, such as a digital camera or a digital video camera, a personal computer, a tablet terminal, a mobile phone, a game machine, a drive recorder, a robot, a drone, or the like, but there is no limitation thereto.

First Embodiment

Figure 2:
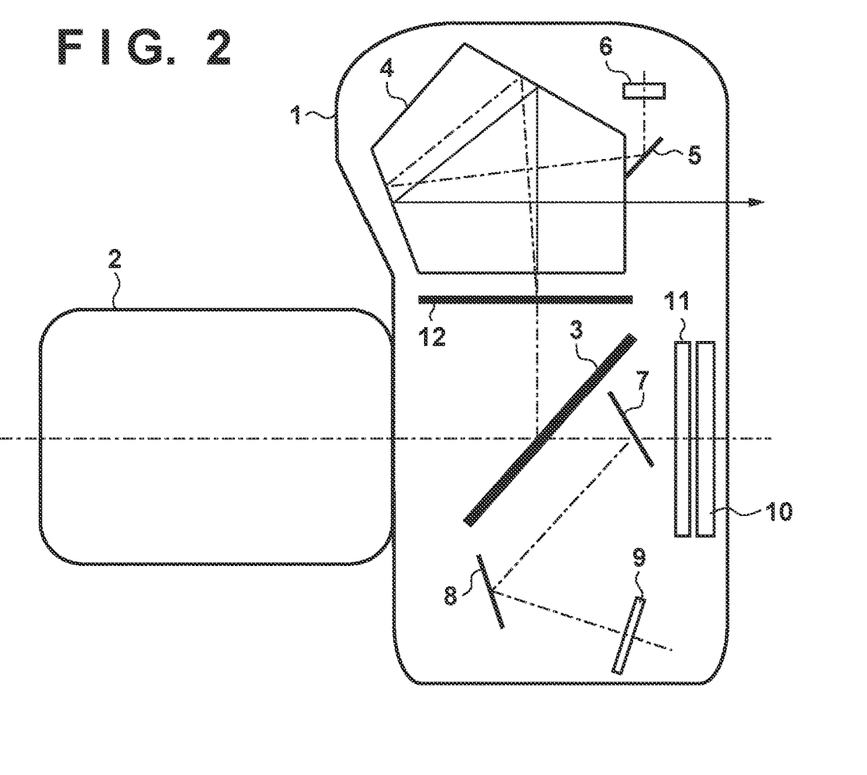
FIG. 2 is a cross sectional view of a general interchangeable lens type digital single lens reflex camera.

FIG. 2 is a cross sectional view illustrating an exemplary arrangement of main optical members, sensors, and the like of a digital camera (hereinafter, referred to as a camera) according to the embodiments. The camera in the present embodiment is an interchangeable lens digital single lens reflex camera, and includes a camera body 1 and an interchangeable lens 2. In the camera body 1, an image sensor 10 is a CMOS image sensor or a CCD image sensor, for example, and in which a plurality of pixels (accumulation type photoelectric conversion elements) are arranged. A mechanical shutter 11 provided forward in the vicinity of the image sensor 10 controls the exposure timing and exposure period of the image sensor 10.

A semi-transmissive main mirror 3 and a first reflecting mirror 7 that is arranged behind the main mirror 3 jump up when shooting is performed. A second reflecting mirror 8 reflects a light beam reflected by the first reflecting mirror 7 such that the reflected light beam is incident on a focus detection sensor (AF sensor) 9. The AF sensor 9 may be an image sensor with fewer pixels than the image sensor 10, for example.

The first reflecting mirror 7, the second reflecting mirror 8, and the focus detection sensor 9 are constituent elements for performing focus detection using a phase difference detection method at any position inside a shooting screen. A photometry sensor (AE sensor) 6 receives light of an image of the shooting screen formed by light reflected by a pentaprism 4 and a third reflecting mirror 5. The AE sensor 6, in which a light receiving portion is divided into a plurality of regions, can output luminance information of a subject for each region. There is no limitation to the number of divisions. Note that amplifier circuits for pixel signals and peripheral circuits for signal processing are formed in the image sensor in addition to the pixels arranged in a light receiving portion.

A finder optical system is constituted by the pentaprism 4. Although not illustrated in FIG. 2, a subject image reflected by the pentaprism 4 can be observed through an eyepiece. A portion of off-optical axis components of the light beam that has been reflected by the main mirror 3 and diffused by the focusing screen 12 is incident on the AE sensor 6. The interchangeable lens 2 communicates with the camera body 1, as necessary, through a contact of a lens mount provided in the camera body 1. Note that, when a live view display is performed or a moving image is recorded, since the main mirror 3 has jumped up, exposure control and focus adjustment control are performed using information regarding a captured image.

Figure 3:
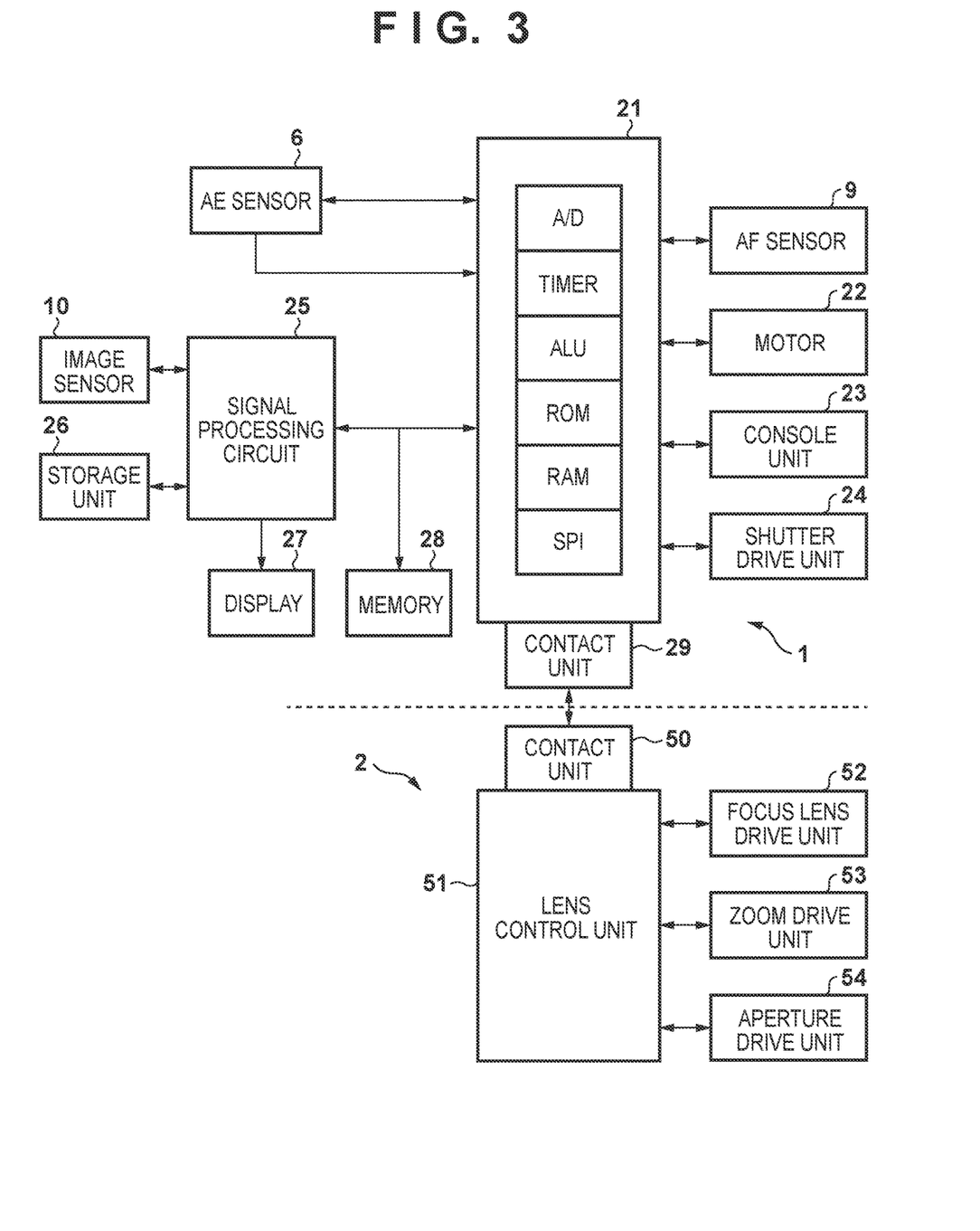
FIG. 3 is a block diagram illustrating an exemplary configuration of electric circuit of a camera and an interchangeable lens.

FIG. 3 is a block diagram illustrating an exemplary configuration of electric circuits of the camera body 1 and the interchangeable lens 2 shown in FIG. 2. A control unit 21 in the camera body 1 is a one-chip microcomputer that incorporates therein an ALU (ARITHMETIC and Logic Unit), a ROM, a RAM, an A/D converter, a timer, a serial communication port (SPI), and the like, for example. The control unit 21 controls operations of the camera body 1 and the interchangeable lens 2 by loading a program stored in the ROM to the RAM and executing the program, for example. The specific operations of the control unit 21 will be described later.

Output signals of the AF sensor 9 and the AE sensor 6 are input to an A/D converter input terminal of the control unit 21. A signal processing circuit 25 controls the image sensor 10 in accordance with the instruction of the control unit 21, and obtains an image signal by applying A/D conversion and signal processing on a signal output from the image sensor 10. Also, the signal processing circuit 25 performs necessary image processing such as compression and composition when an obtained image signal is to be recorded. A memory 28 is a DRAM or the like, and is used as a work memory when the signal processing circuit 25 performs various types of signal processing, or a VRAM when an image is displayed in a later-described display 27. The display 27 is either a liquid-crystal display provided on the rear side of the camera body 1 or an external display. The display 27 displays information such as setting values of the camera, a message, and a menu screen and a captured image. The display 27 is assumed to be an HDR-capable display. The display 27 is controlled by an instruction from the control unit 21. A storage unit 26 is a semiconductor memory card, for example, and receives a captured image signal input from the signal processing circuit 25.

A motor 22 follows the control of the control unit 21, controls up/down movement of the main mirror 3 and the first reflecting mirror 7, and performs charging of the mechanical shutter 11. A console unit 23 is an input device group such as a switch that is used when a user operates the camera. The console unit 23 includes a release switch for instructing to start a shooting preparation operation and to start shooting, a shooting mode selection switch for selecting the shooting mode, an arrow key, a determination key, and the like. A contact unit 29 has contacts for performing communication with the interchangeable lens 2. Input/output signal lines of a serial communication port of the control unit 21 are connected to the contacts. A shutter drive unit 24, which is connected to an output terminal of the control unit 21, drives the mechanical shutter 11.

A contact unit 50 that forms a pair with the contact unit 29 is provided in the interchangeable lens 2. A lens control unit 51, which is a one-chip microcomputer similar to the control unit 21, is connected to the contact unit 50, and can communicate with the control unit 21. The lens control unit 51 includes a microprocessor, a ROM, and a RAM, for example, and controls operations of the interchangeable lens 2 based on the instruction from the control unit 21 by loading a program stored in the ROM to the RAM and executing the program. Also, the lens control unit 51 notifies the control unit 21 of information such as a status of the interchangeable lens 2. A focus lens drive unit 52 is connected to an output terminal of the lens control unit 51, and drives a focus lens. A zoom drive unit 53 changes the angle of view of the interchangeable lens in accordance with the control of the lens control unit 51. An aperture drive unit 54 adjusts the aperture amount of the aperture in accordance with the control of the lens control unit 51.

When the interchangeable lens 2 is attached to the camera body 1, data can be communicated between the lens control unit 51 and the control unit 21 of the camera body via the contact units 29 and 50. Also, electric power for driving the motor and actuator in the interchangeable lens 2 is supplied through the contact units 29 and 50. Information such as optical information unique to the lens that is used by the control unit 21 of the camera body to perform focus detection and an exposure computation, and information regarding the subject distance based on a distance encoder are output from the lens to the control unit 21 of the camera body through data communication. Also, focus adjustment information and aperture information that have been obtained as a result of the control unit 21 of the camera body having performed focus detection and an exposure computation are output from the control unit 21 of the camera body to the lens through data communication, and the lens controls the focus lens in accordance with the focus adjustment information, and controls the aperture in accordance with the aperture information.

Hereinafter, specific operations from shooting to development in the first embodiment will be described using FIG. 1 and FIGS. 3 to 8. When the control unit 21 enters an operable state by the power switch included in the console unit 23 in FIG. 3 having been turned on or the like, first, the control unit 21 performs communication with the lens control unit 51 of the interchangeable lens 2, and performs initialization processing such as obtaining various types of lens information necessary for focus detection and photometry. Also, various settings made by a user are received through the console unit 23, and any shooting mode is set. When a shutter switch included in the console unit 23 is pressed half-way, the control unit 21 starts operations of AF (autofocus) processing and AE (automatic exposure) processing. Thereafter, when the shutter switch is pressed fully, the control unit 21 starts operations of shooting.

Figure 4:
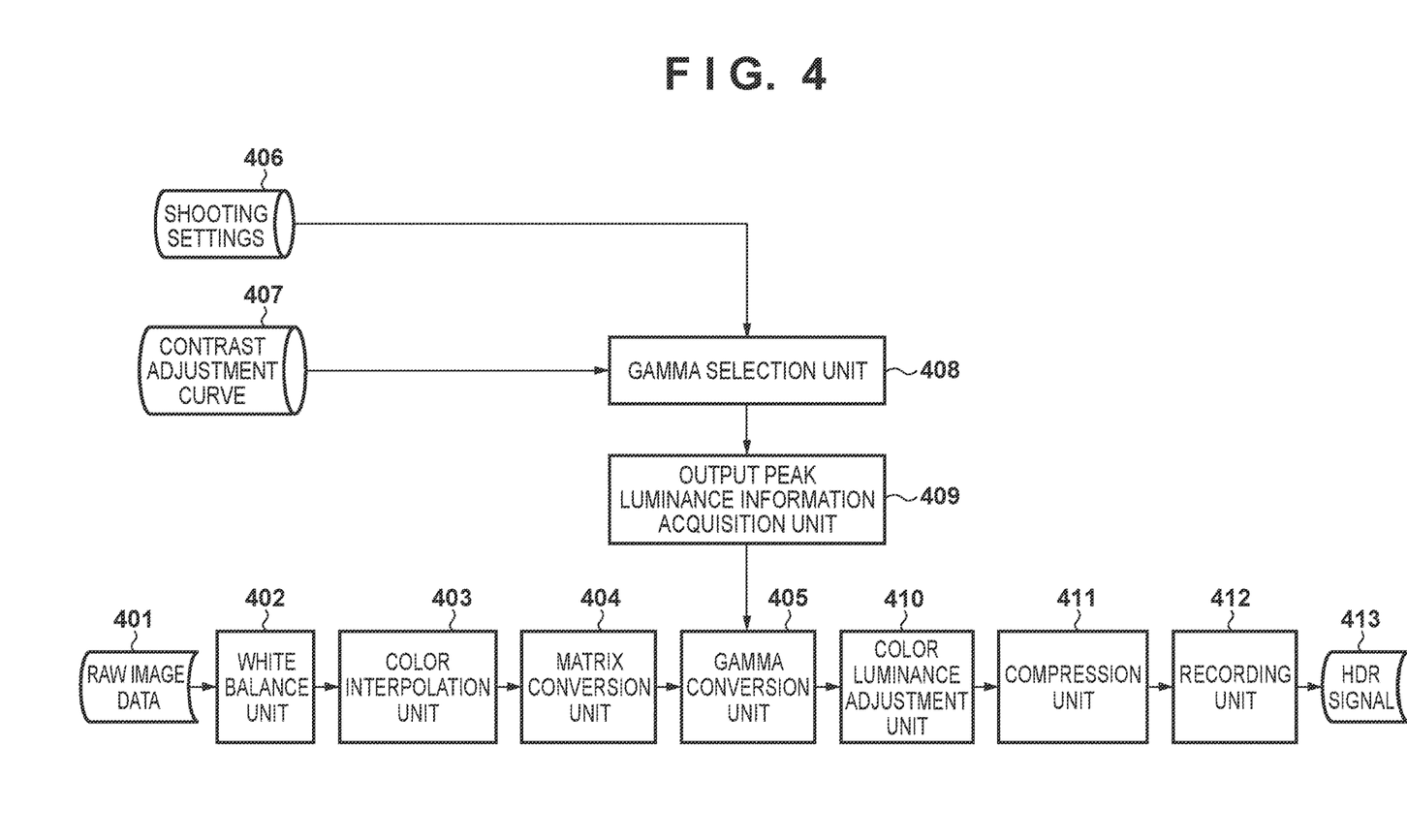
FIG. 4 is a diagram illustrating a tone mapping operation in a first embodiment.

Thereafter, development of a RAW image obtained by shooting is performed. The development of a RAW image will be described using FIG. 4. In FIG. 4, the reference signs 402 to 405 and 408 to 412 denote functional blocks, each of which indicates processing performed by the control unit 21, but one or more of the functional blocks may be realized as a hardware circuit. Each piece of pixel data that constitutes RAW image data 401 indicates the intensity in the color of a color filter provided in a corresponding pixel, and does not include information regarding other colors. Here, it is assumed that one of color filters of red (R), green (G), and blue (B) is provided in each pixel of the image sensor.

A white balance unit 402 performs processing for correcting color fogging due to the light source in order to reproduce white. Specifically, the white balance unit 402 plots respective pieces of RGB data of pixels constituting the RAW image data 401 in a predetermined color space such as an xy color space. Also, the white balance unit 402 integrates R, G, and B values of data that is plotted in the vicinity of a point, on the blackbody radiation locus, that is highly possibly the light source color in the color space, and obtains white balance coefficients G/R and GB of the R and B components from the integrated value. The white balance unit 402 performs white balance processing by applying the white balance coefficients to image data.

A color interpolation unit 403 generates a color image including all pieces of R, G, and B color information with respect to all of the pixels by performing noise reduction processing and color interpolation processing. A basic color image is generated by subjecting the generated color image to processing performed by a matrix conversion unit 404 and gamma conversion unit 405. Here, the gamma characteristic in the case of HDR development in the gamma conversion unit 405 is an inverse characteristic of EOTF (Inverse EOTF), and is an inverse characteristic of PQ (Perceptual Quantization) (FIG. 6) shown in FIG. 6, for example. Note that OETF (Optical-Electro Transfer Function) in which Inverse EOTF and OOTF (Opto-Optical Transfer Function) characteristics are combined may be used.

The gamma conversion unit 405 performs gamma conversion using a contrast adjustment curve (also referred to as a gamma characteristic, a tone characteristic for contrast adjustment, or a gamma curve). Shooting modes in which output dynamic ranges are different as shown in FIG. 1 are installed in a known camera, and a user selects one of the modes to be used for shooting depending on the scene. Here, the difference in the dynamic range between two modes causes a difference in the peak luminance when HDR development is performed. Similarly, the dynamic range may differ depending on the ISO speed. In the image sensor, relative to the reference ISO speed 100 in which amplifier gain is zero, the dynamic range increases at higher sensitivity at ISO 200 or higher at which an analog gain or a digital gain is applied, because the charge amount is smaller relative to the capacity of the photodiode. Also, with respect to the intermediate ISO speed in units of one third stop, in an image sensor including a low cost amplifier whose gain step corresponds to only one stop, the intermediate ISO speed is realized by gain-up or gain-down from the representative ISO speed.

Here, when gain-down is performed, because the saturated signal level decreases, the dynamic range decreases. In this way, there are cases where the peak luminance differs depending on shooting settings, specifically depending on the ISO speed. Therefore, the gamma curves whose number corresponds to the number of combinations between the shooting modes and the ISO speeds are pre-stored in the memory 28 as contrast adjustment curves 407. Also, a gamma selection unit 408 refers to the shooting settings (shooting mode and ISO speed) 406, reads out the contrast adjustment curve 407 corresponding to the combination of the shooting mode and the ISO speed from the memory 28, and outputs the contrast adjustment curve 407 to an output peak luminance information acquisition unit 409.

Next, in step S501 (FIG. 5), the output peak luminance information acquisition unit 409 acquires absolute luminance corresponding to each output value of the gamma curve from the acquired contrast adjustment curve 407. The absolute luminance value can be acquired using EOTF such as PQ (FIG. 6) or HLG. Also, the output peak luminance information acquisition unit 409 acquires the maximum value of output values of the contrast adjustment curve 407 or the nits value corresponding thereto. Note that, in this specification, the maximum value of output values of the gamma curve data, that is, the tone value at the peak luminance value in the output dynamic range, or the nits value corresponding thereto is referred to as maxDRL (maximum Dynamic Range Level).

Figure 5:
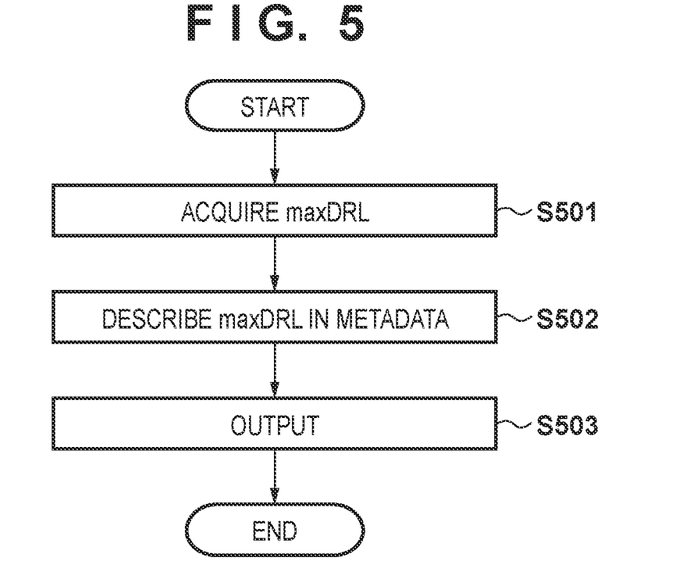
FIG. 5 is a flowchart relating to the operation for calculating maxDRL in the first embodiment.
Figure 6:
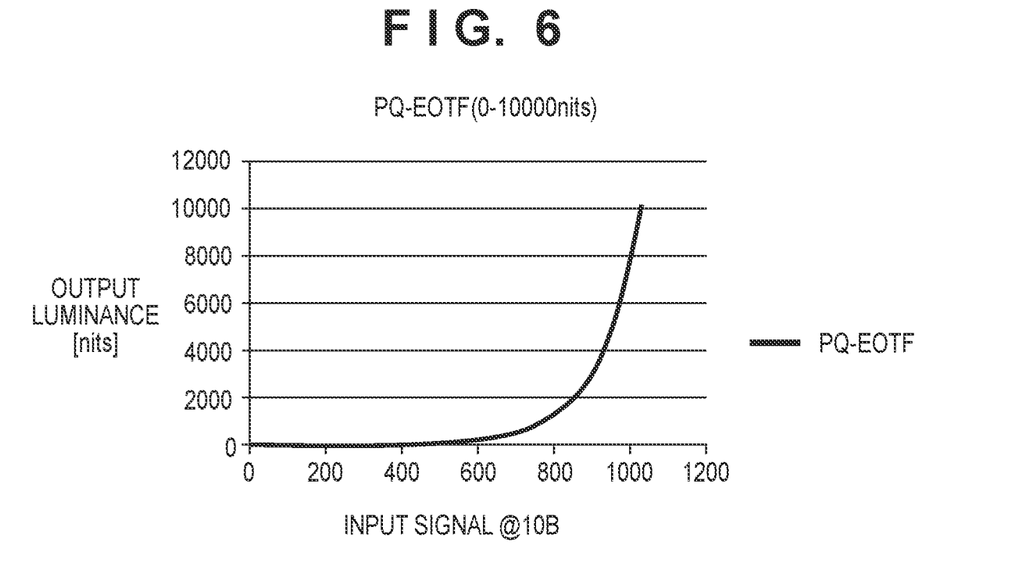
FIG. 6 is a diagram illustrating characteristics of PQ (Perceptual Quantization), which is EOTF standardized in SMPTE ST2084.

Thereafter, a color luminance adjustment unit 410 performs processing for improving the visual quality of an image on a color image, and image correction in which an evening scene is detected and chroma enhancement is performed, for example, is performed according to the scene. Upon completing the color luminance adjustment, a compression unit 411 compresses a high resolution image using a method such as HEVC. Also, in step S502, a recording unit 412 generates an HDR signal 413 by describing maxDRL acquired by the output peak luminance information acquisition unit 409 in metadata of a file, and outputs the file in step S503. Accordingly, the maxDRL is recorded in association with the HDR signal 413.

Figure 7:
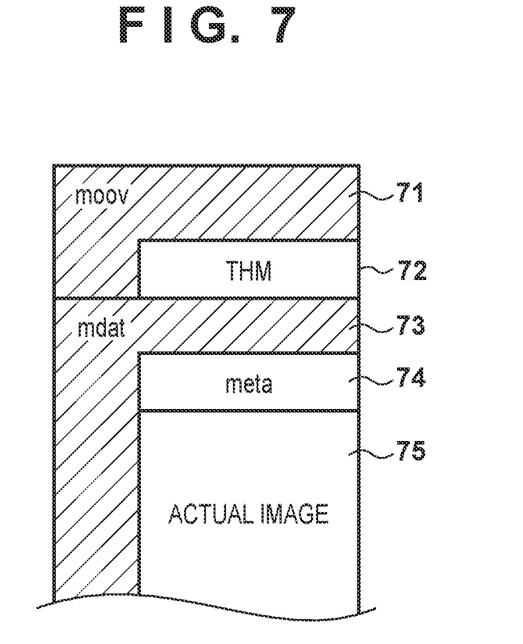
FIG. 7 is a diagram illustrating an example of a data file structure used in embodiments.

FIG. 7 is an example of a file structure for recording an HDR signal. Header information such as a thumbnail image 72 is stored in an area indicated by the reference sign 71, and information regarding an actual image such as metadata 74 and actual image data 75 is stored in an area indicated by the reference sign 73. In step S502, maxDRL may be recorded in the metadata 74 in FIG. 7 or in another specific area. Note that, because the depth of a known JPEG format is 8 bits, although the depth of at least 10 bits is needed in order to express an HDR signal in PQ, in actuality, a container for an HDR still image needs to be newly adopted. Here, a container in HEIF (High Efficiency Image File Format), which is an image file format defined by MPEG (Moving Picture Experts Group) —H Part 12 (ISO/IEC 23008-12), is adopted. HEIF has a feature that not only an actual image, but a thumbnail, a plurality of temporally related files, and metadata such as Exif and XMP can be stored in one file. Therefore, a 10-bit image sequence encoded in HEVC can also be stored in the file. The aforementioned maxCLL is not defined in the HEIF standard, but maxDRL in addition to maxCLL is also stored in MakerNote of Exif, in this proposal.

Figure 8:
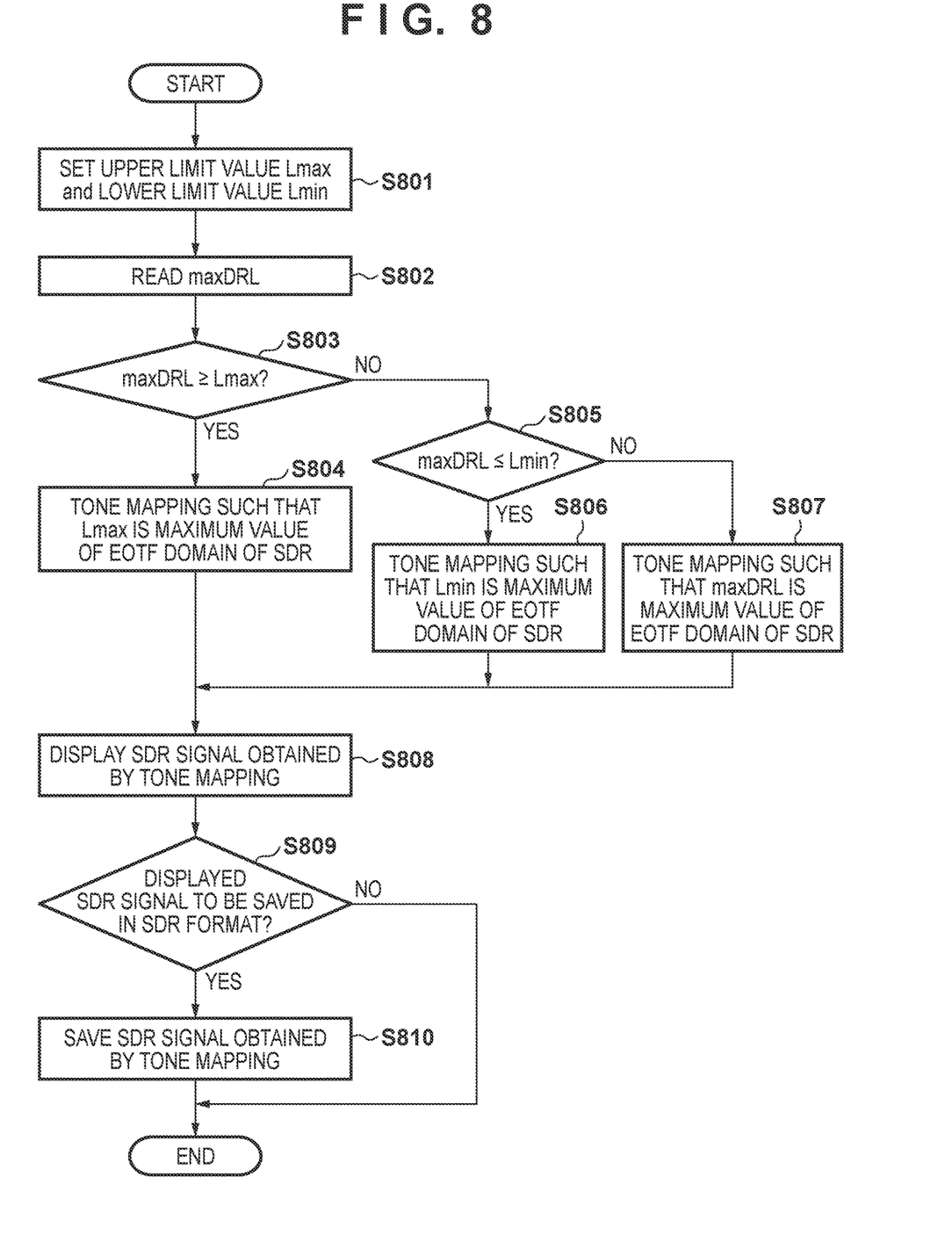
FIG. 8 is a flowchart relating to the tone mapping operation in the first embodiment.

Moreover, the method of performing tone mapping for mapping the HDR signal 413 to an SDR signal using maxDRL in order to view the HDR signal 413 in the SDR environment will be described using FIG. 8. This processing can be performed by the control unit 21 or the signal processing circuit 25, and here, the processing is performed by the control unit 21.

In step S801, the control unit 21 sets an upper limit value Lmax and a lower limit value Lmin for displaying the HDR signal in a full range of EOTF of the SDR signal. For example, Lmax can be set to 2,000 nits and Lmin can be set to 100 nits, but there is no limitation thereto. Also, the upper limit value Lmax and the lower limit value Lmin may be set by a user.

Next, in step S802, the control unit 21 acquires maxDRL from metadata of the file in which the HDR signal is recorded.

In step S803, the control unit 21 compares Lmax with maxDRL. Here, if maxDRL is greater than or equal to Lmax, the control unit 21 performs tone mapping such that Lmax is the maximum value of the EOTF domain of SDR, in step S804.

On the other hand, if maxDRL is less than Lmax, the control unit 21 compares maxDRL with Lmin, in step S805. If maxDRL is less than or equal to Lmin, the control unit 21 performs tone mapping such that Lmin is the maximum value of the EOTF domain of SDR, in step S806. Also, if maxDRL is greater than Lmin, the control unit 21 performs tone mapping such that maxDRL is the maximum value of the EOTF domain of SDR, in step S807.

Next, in step S808, the control unit 21 displays the SDR signal obtained by tone mapping in the display 27.

In step S809, the control unit 21 inquires a user of whether or not the SDR signal subjected to tone mapping is saved in an SDR format, by displaying GUI in the display 27, for example. If the user instructs that the SDR signal is to be saved through the console unit 23, for example, the control unit 21 saves the SDR signal in the SDR format in the storage unit 26, in step S810. If the user instructs that the SDR signal is not to be saved, the control unit 21 ends the processing without saving the SDR signal.

As described above, in the present embodiment, when an HDR signal is recorded in a file, maxDRL, which is peak luminance information regarding the output dynamic range, is described as metadata. With this, an HDR signal can be mapped to an SDR signal considering the dynamic range, and the difference in brightness can be suppressed between a case where the HDR signal is viewed in an HDR environment, and a case where the HDR signal is mapped to an SDR signal and viewed in an SDR environment.

Second Embodiment

Next, a second embodiment of the present invention will be described using FIGS. 9 to 11. In the first embodiment, a method is described in which, when an HDR signal is recorded in a file, maxDRL, which is peak luminance information regarding the output dynamic range, is described as metadata. In the second embodiment, a method of updating maxDRL when retouching such as tone curve correction, in which the peak luminance in the output dynamic range is to be changed, has been performed on an HDR signal that has been recorded in a file will be described.

Figure 9:
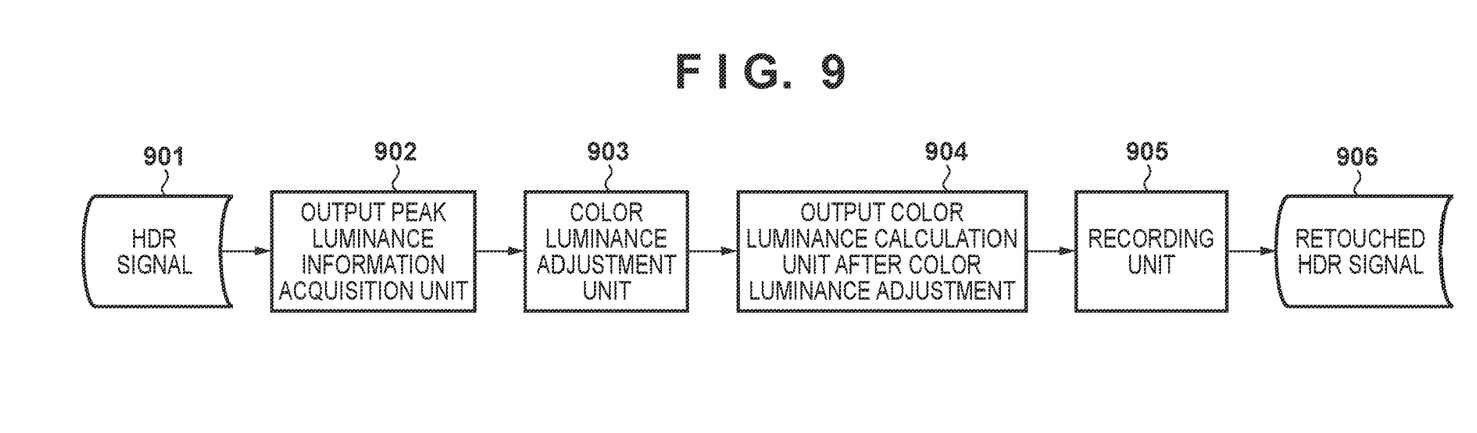
FIG. 9 is a diagram illustrating an operation for updating maxDRL in a second embodiment.
Figure 10:
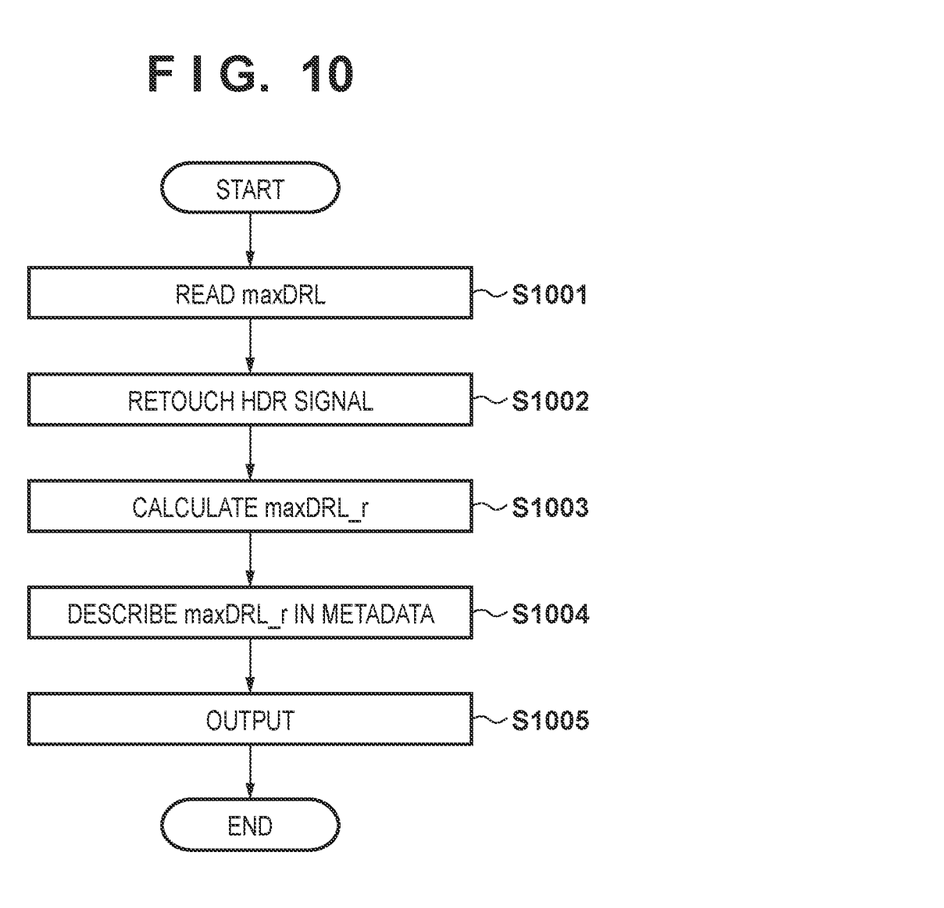
FIG. 10 is a flowchart relating to an operation for updating maxDRL in the second embodiment.

In FIG. 9, the reference signs 902 to 905 denote functional blocks each of which indicates processing performed by the control unit 21, but one or more of the functional blocks may be realized as a hardware circuit.

In step S1001 (FIG. 10), an output peak luminance information acquisition unit 902 acquires maxDRL described in metadata of an HDR signal 901.

In step S1002, a color luminance adjustment unit 903 displays an image based on the HDR signal 901 and GUI for image retouching such as tone curve correction in a display 27. Also, the color luminance adjustment unit 903 corrects the color and luminance of an image in accordance with the user instruction made through a console unit 23.

In step S1003, an output peak luminance information calculation unit 904, after color luminance adjustment, calculates peak luminance information maxDRL_r of the output dynamic range on which image correction by retouching is reflected, with respect to maxDRL acquired by the output peak luminance information acquisition unit 902. The tone value y after correction can be obtained using following Equation 1, where x is the tone value of an input signal before correction and f is the input-output characteristic for correction.

$$y = f(x) \quad \text{Equation 1}$$

Here, when the correction using the input-output characteristic f is performed on tone values x in a range of $0 \le x \le \text{maxDRL}$, and ymax is the maximum value of tone values y after correction, the tone values y of the HDR signal after correction satisfies $0 \le y \le y\text{max}$, due to tone curve correction. Here, the output peak luminance information calculation unit 904 obtains maxDRL_r using following Equation 2.

$$\text{maxDRL}\_r = y \max \quad \text{Equation 2}$$

Figure 11A:
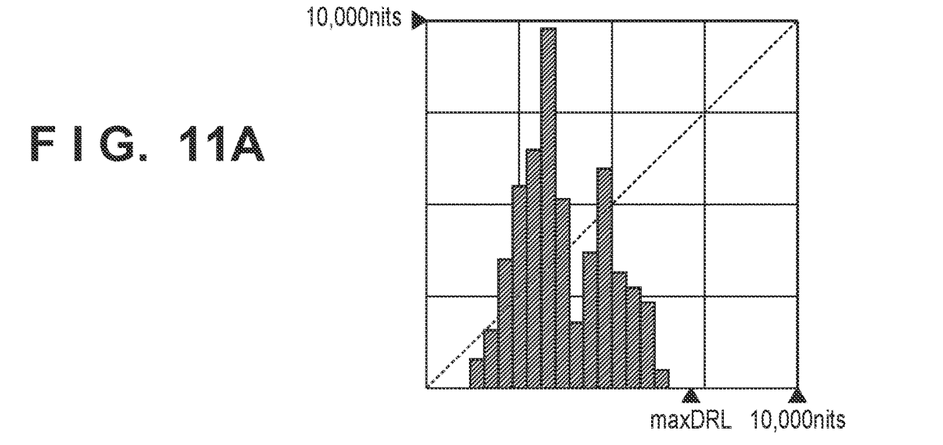
FIGS. 11A to 11C are diagrams illustrating an example of retouching and an exemplary calculation of maxDRL_r in the second embodiment.
Figure 11B:
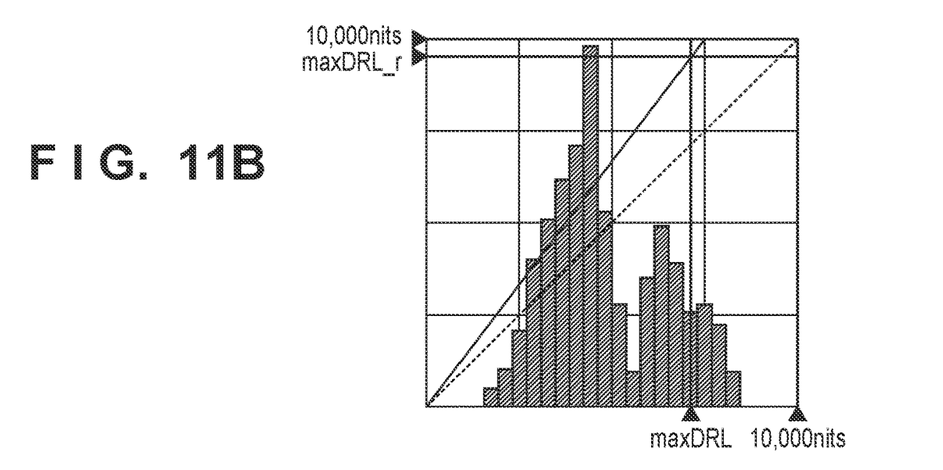
Figure 11C:
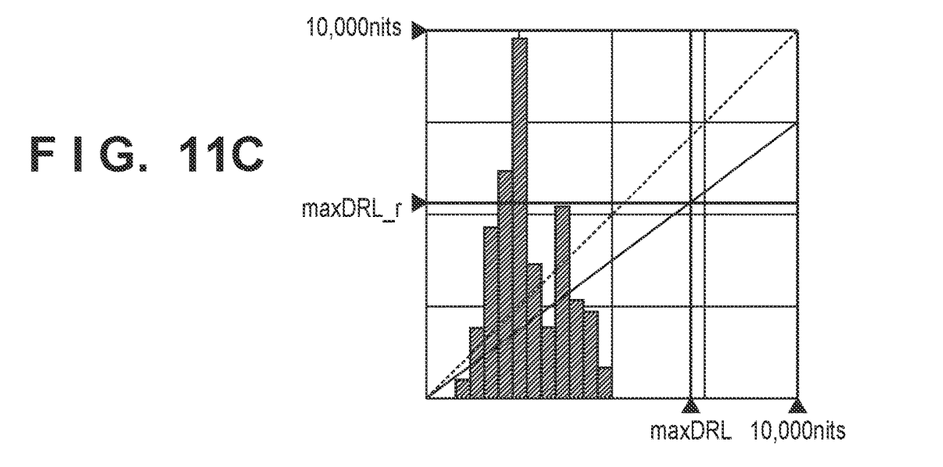

An example of retouching and an exemplary calculation of maxDRL_r are shown in FIGS. 11A to 11C. FIG. 11A shows a luminance histogram before retouching, FIG. 11B shows a luminance histogram when retouching is performed so as to increase the luminance, and FIG. 11C shows a luminance histogram when retouching is performed so as to decrease the luminance. When retouching as shown in FIG. 11B is performed, maxDRL_r is larger than maxDRL, and when, conversely, retouching as shown in FIG. 11C is performed, maxDRL_r is smaller than maxDRL.

In step S1004, the recording unit 905 records maxDRL_r to metadata 74 of the HDR signal.

In step S1005, the recording unit 905 records the file of the HDR signal to the storage unit 26.

Also, as a result of applying the first embodiment to a retouched HDR signal and performing tone mapping such that maxDRL_r is the maximum value of the EOTF domain of SDR, the retouched HDR signal can be viewed at appropriate brightness in the SDR environment.

Third Embodiment

Figure 12:
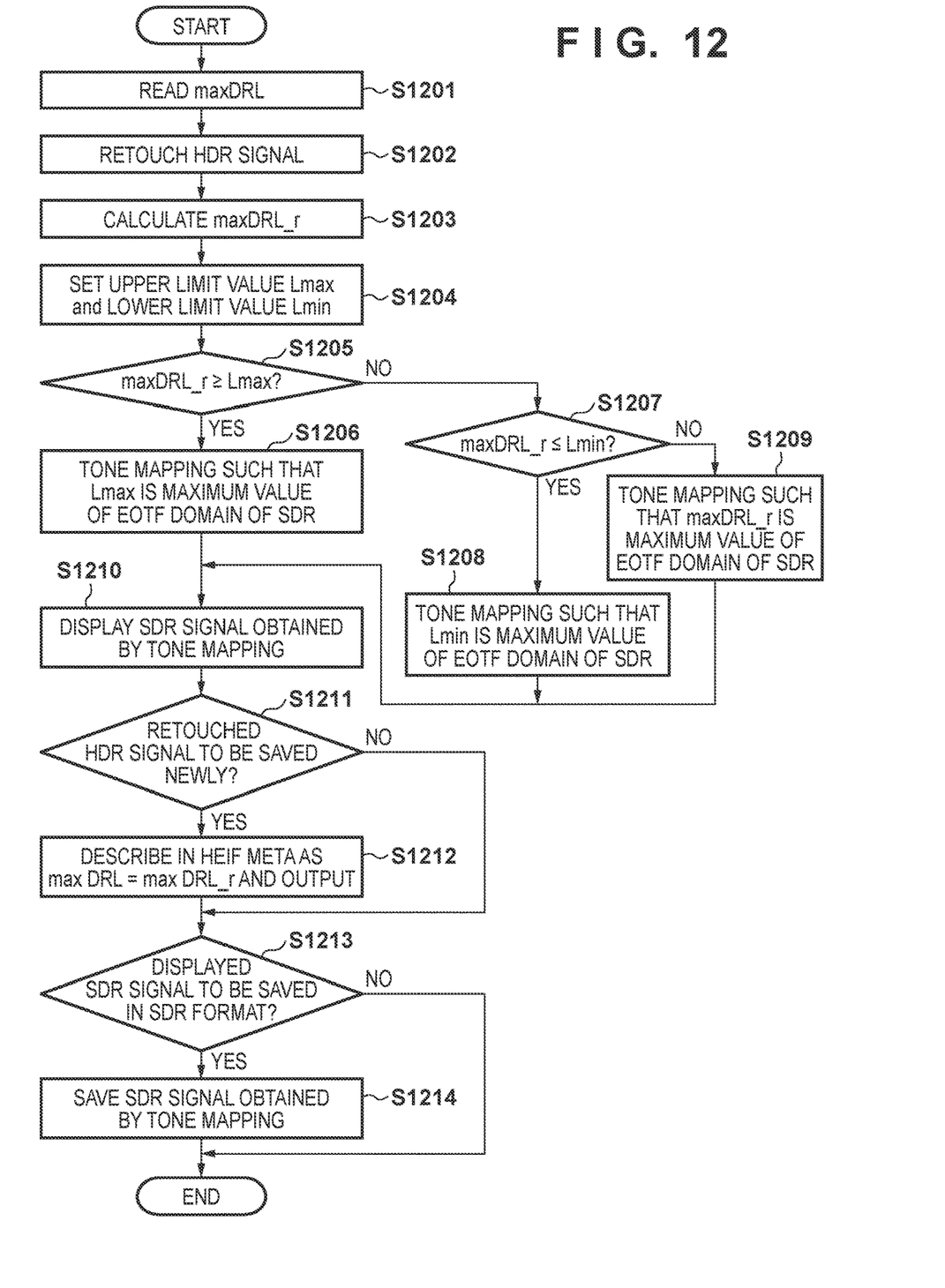
FIG. 12 is a flowchart relating to a tone mapping and an operation for updating maxDRL in a third embodiment.

Next, a third embodiment of the present invention will be described using FIG. 12. In the first and second embodiments, a procedure for viewing a saved HDR signal in the SDR environment has been described. In the present embodiment, a method of performing tone mapping in real time, when retouching such as tone curve correction is performed on an HDR signal in the SDR environment, in order to view the HDR signal on which retouching is being performed or retouching have been completed, in the SDR environment, will be described.

Output dynamic range peak luminance information maxDRL_r to which retouch information is added is calculated, in steps S1201 to S1203, using a procedure similar to that in step S1001 to S1003 in the second embodiment. Next, in steps S1204 to S1210, the HDR signal is tone-mapped to an SDR signal with a procedure similar to that in steps S801 to S808 in the first embodiment, and displayed in the display 27. The display here corresponds to viewing in the SDR environment.

Next, in step S1211, the control unit 21 inquires a user of whether or not the retouched HDR signal is saved as a new file, by displaying GUI in the display 27, for example. If the user instructs that the HDR signal is to be saved through the console unit 23, for example, the control unit 21 saves the HDR signal in which maxDRL_r is saved in the metadata 74 into the storage unit 26 in step S1212, and advances the processing to step S1213. Also, if the user instructs that the HDR signal is not to be saved, the control unit 21 advances the processing to step S1213 without saving the HDR signal.

Since the processing in steps S1213 to S1214 is similar to the processing in steps S809 to S810 in the first embodiment, the description thereof will be omitted.

According to the present embodiment, even if an HDR signal is retouched in the SDR environment, maxDRL is saved in a file of the retouched HDR signal, and the file can be recorded. Therefore, when an HDR signal is viewed in the SDR environment, as a result of maxDRL being referred to, the maximum luminance value of the output dynamic range after retouching can be mapped to the maximum value of the EOTF domain of the SDR signal.

Note that, when a RAW file is developed to a file in an HDR format using development software or the like in the SDR environment as well, an HDR signal that has been tone-mapped to an SDR signal using the procedure of the third embodiment may be displayed.

Fourth Embodiment

Next, a fourth embodiment of the present invention will be described. In the second embodiment, when the peak luminance is changed due to an image retouch, maxDRL as metadata is updated. On the other hand, in the present embodiment, even in a case where the peak luminance is changed due to an image retouch, maxDRL as metadata is not updated. A case is assumed where the peak luminance of an image is changed by retouching in which sharpness strength is changed, for example, and maxDRL is updated. In this case, if tone mapping to SDR is performed based on maxDRL, the image tone is changed due to the sharpness strength. However, when a user desires to confirm an image while changing the sharpness strength, for example, it is desirable that only the effect of sharpness is to be changed without changing the image tone. Therefore, in the present embodiment, even in a case where the peak luminance is changed due to an image retouch, maxDRL as metadata is not updated. Note that a configuration may be adopted in which one of a mode in which maxDRL is updated as in the second embodiment and a mode in which maxDRL is not updated as in the present embodiment can be selected by user operation or automatically.

Fifth Embodiment

In the embodiments described above, descriptions have been given mainly assuming a still image file. In the present embodiment, an embodiment in which a moving image file is assumed will be described.

Figure 13A:
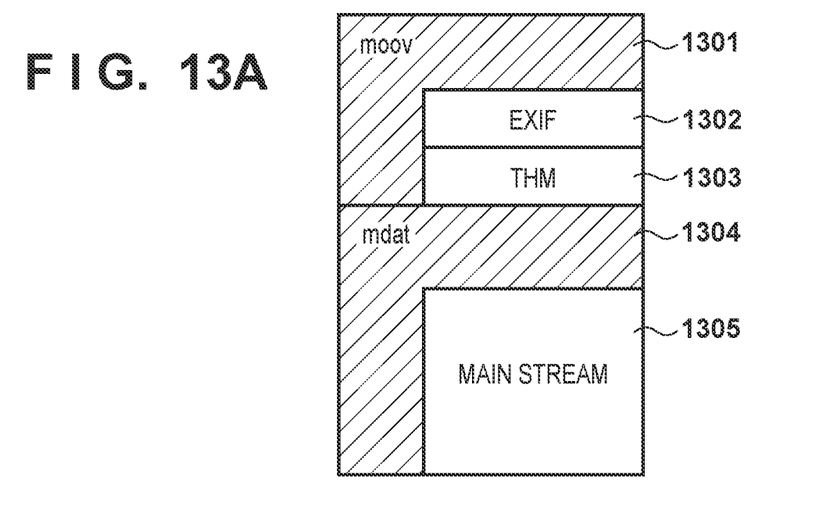
FIGS. 13A and 13B are diagrams illustrating an example of a data file structure used in a fifth embodiment.

FIG. 13A shows a data structure of an MP4 format, which is an example of a moving image file format. The data structure of the MP4 format includes an area 1301 for recording metadata, and an area 1304 for recording a stream 1305 of a moving image. The area 1301 of these areas includes an Exif area 1302 and a thumbnail area 1303, and maxDRL is recorded in the Exif area 1302. However, there are cases where the peak luminance, in moving image data, changes in the middle of the moving image data that has been continuously recorded, when the mode was changed while recording was performed, for example. In this case, what is to be recorded as maxDRL in the Exif area 1302 is an issue. Therefore, in the present embodiment, the peak luminance based on settings when shooting of the moving image is started (peak luminance in a start frame of moving image data) is recorded in the Exif area 1302 as maxDRL. Note that another value may be used as maxDRL, as long as the value represents the peak luminance of the moving image data. For example, peak luminance in an end frame of the moving image data, a maximum value of the peak luminance in all the frames, a minimum value of the peak luminance in all the frames, an average value of the peak luminance in all the frames, a median value of the peak luminance in all the frames, or the like can be used.

Figure 13B:
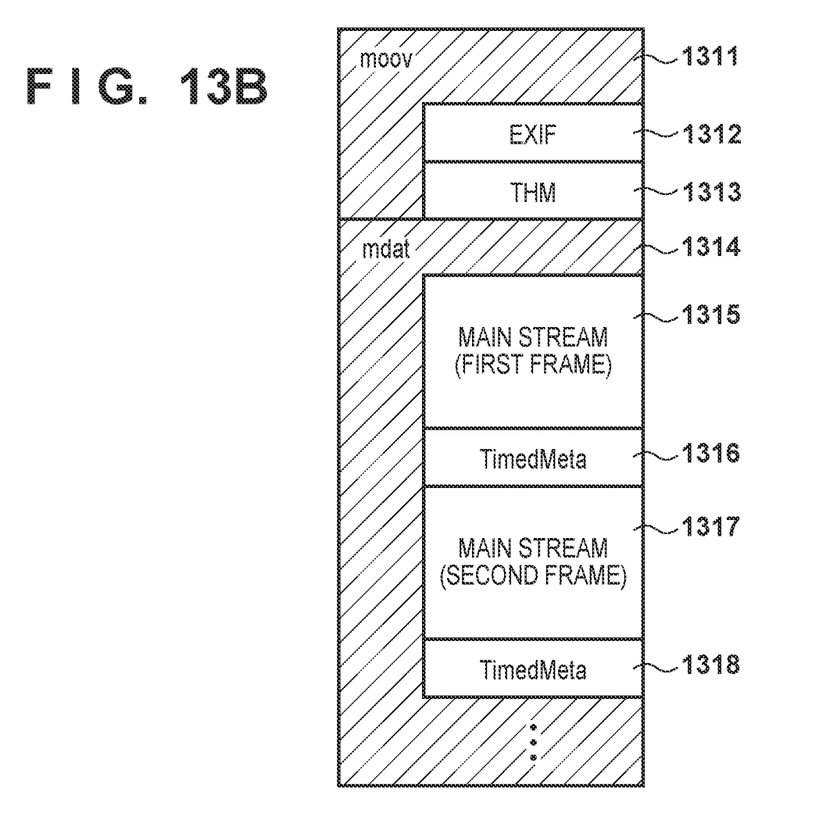

Also, there is a file format in which metadata can be recorded in each frame, as shown in FIG. 13B. Areas 1311, 1312, 1313, and 1314 are similar to the areas 1301, 1302, 1303, and 1304 in FIG. 13A. An area 1315 is a first frame of a moving image, and an area 1317 is a second frame of the moving image. Also, the file format in FIG. 13B includes a metadata area for each frame. An area 1316 is a metadata area for the first frame, and an area 1318 is a metadata area for the second frame. When such a file format is adopted, the peak luminance in each frame may be recorded as maxDRL. In this case, the peak luminance in each frame is recorded in each of the metadata areas 1316 and 1318 for the respective frames. Of course, the representative peak luminance described above may further be recorded in the Exif area 1312, which is a metadata area for the entire file.

Other Embodiments

In the embodiments described above, maxDRL is described as the metadata of a file, but the mode is not limited to the mode in which maxDRL is handled as metadata of a file. For example, the following mode is conceivable when a digital camera and an HDR-capable display are directly connected through HDMI, and an HDR signal is output. That is, a mode is conceivable in which the digital camera outputs a value corresponding to maxDRL, to a recording medium for outputting signals, as metadata of the HDR signal, and this value is input to the HDR-capable display.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-164801, filed on Sep. 3, 2018, and Japanese Patent Application No. 2019-141685, filed on Jul. 31, 2019, which are hereby incorporated by reference herein in their entirety.

What is claimed is:

1. An image processing apparatus that records a high dynamic range (HDR) signal as a file, comprising:
one or more processors that execute instructions stored in a memory to function as:
an acquisition unit configured to acquire information indicating peak luminance of one output dynamic range, of a plurality of different output dynamic ranges that are set in the image processing apparatus in advance, in accordance with shooting settings of the HDR signal; and a recording unit configured to record a first value based on the information acquired by the acquisition unit to the file along with the HDR signal.

2. The image processing apparatus according to claim 1, further comprising an image sensor for capturing an image of a subject,
wherein the HDR signal is generated from a signal obtained from the image sensor,
the shooting settings include a shooting mode, and
the shooting mode is one of a plurality of shooting modes corresponding to the plurality of different output dynamic ranges.

3. The image processing apparatus according to claim 2, wherein tone characteristics for contrast adjustment that are applied to a signal obtained from the image sensor differ according to a shooting mode included in the shooting settings.

4. The image processing apparatus according to claim 3, wherein the plurality of different output dynamic ranges are determined in accordance with the tone characteristics for contrast adjustment, and the peak luminance is a maximum output value in the tone characteristics for the contrast adjustment of the one output dynamic range.

5. The image processing apparatus according to claim 1, wherein the one or more processors execute instructions stored in the memory to further function as:
an update unit configured to update the first value when the peak luminance has changed due to correction of color or luminance performed on the HDR signal.

6. The image processing apparatus according to claim 1, wherein the first value is not updated even when the peak luminance has changed due to correction of color or luminance performed on the HDR signal.

7. The image processing apparatus according to claim 1, wherein the one or more processors execute instructions stored in the memory to further function as:
a conversion unit configured to convert the HDR signal to a signal in a predetermined format by converting tone values of the HDR signal to tone values in the predetermined format having a different dynamic range, based on the first value.

8. The image processing apparatus according to claim 7, wherein the different dynamic range is a standard dynamic range (SDR).

9. The image processing apparatus according to claim 1, wherein the file is recorded in a high efficiency image file format (HEIF).

10. An image processing apparatus that processes a high dynamic range (HDR) signal, comprising:
one or more processors that execute instructions stored in a memory to function as:
an acquisition unit configured to acquire a first value indicating peak luminance, wherein the first value is recorded in association with the HDR signal and is information indicating peak luminance of one output dynamic range, of a plurality of different output dynamic ranges that are set in the image processing apparatus in advance, in accordance with shooting settings of the HDR signal, and
a conversion unit configured to convert the HDR signal to a signal in a predetermined format by performing a tone-mapping that maps tone values of the HDR signal to tone values in the predetermined format having a different dynamic range, based on the first value.

11. The image processing apparatus according to claim 10, wherein the conversion unit, when the first value is smaller than a predetermined second value, performs a tone-mapping in which the first value is mapped to a maximum tone value in the predetermined format.

12. The image processing apparatus according to claim 11, wherein the conversion unit, when the first value is larger than the predetermined second value, performs a tone-mapping in which the second value is mapped to a maximum tone value in the predetermined format.

13. The image processing apparatus according to claim 10, wherein a signal in the predetermined format is a standard dynamic range (SDR) signal.

14. The image processing apparatus according to claim 10, wherein the HDR signal is recorded as a file in a high efficiency image file format (HEIF).

15. A control method of an image processing apparatus that records a high dynamic range (HDR) signal as a file, the control method comprising:
acquiring information indicating peak luminance of one output dynamic range, of a plurality of different output dynamic ranges that are set in the image processing apparatus in advance, in accordance with shooting settings of the HDR signal; and
recording a first value based on the information acquired by the acquiring to the file along with the HDR signal.

16. A control method of an image processing apparatus that processes a high dynamic range (HDR) signal, the control method comprising:
acquiring a first value indicating peak luminance, wherein the first value is recorded in association with the HDR signal and is information indicating peak luminance of one output dynamic range, of a plurality of different output dynamic ranges that are set in the image processing apparatus in advance, in accordance with shooting settings of the HDR signal, and
converting the HDR signal to a signal in a predetermined format by performing a tone-mapping that maps tone values of the HDR signal to tone values in the predetermined format having a different dynamic range, based on the first value.

17. A non-transitory computer-readable medium that stores instructions executable by a computer, wherein the instructions, when executed by the computer, causes the computer to operate as an image processing apparatus that records a high dynamic range (HDR) signal as a file, comprising:
an acquisition unit configured to acquire information indicating peak luminance of one output dynamic range, of a plurality of different output dynamic ranges that are set in the image processing apparatus in advance, in accordance with shooting settings of the HDR signal; and
a recording unit configured to record a first value based on the information acquired by the acquisition unit to the file along with the HDR signal.

18. A non-transitory computer-readable medium that stores instructions executable by a computer, wherein the instructions, when executed by the computer, causes the computer to operate as an image processing apparatus that processes a high dynamic range (HDR) signal, comprising:
an acquisition unit configured to acquire a first value indicating peak luminance, wherein the first value is recorded in association with the HDR signal and is information indicating peak luminance of one output dynamic range, of a plurality of different output dynamic ranges that are set in the image processing apparatus in advance, in accordance with shooting settings of the HDR signal, and a conversion unit configured to convert the HDR signal to a signal in a predetermined format by performing a tone-mapping that maps tone values of the HDR signal to tone values in the predetermined format having a different dynamic range, based on the first value.

* * * * *